United States Patent Office 3,498,888
Patented Mar. 3, 1970

3,498,888
METHOD OF PERFORMING COULOMETRIC
ANALYSES AND AN APPARATUS THEREFOR
Gillis Rune Johansson, Lund, Sweden, assignor, by mesne assignments, to Jungner Instrument AB, Stockholm, Sweden, a joint-stock company of Sweden
Filed Oct. 18, 1965, Ser. No. 496,937
Claims priority, application Sweden, Nov. 10, 1964, 13,520/64
Int. Cl. G01n 27/42, 27/44
U.S. Cl. 204—1                             4 Claims

ABSTRACT OF THE DISCLOSURE

A method and apparatus of performing controlled-potential coulometry, wherein a solution to be analyzed is continuously fed through a confined region in which it is contacted with a three-electrode system comprising a working electrode, a reference electrode and an auxiliary electrode. The working electrode is moved to effect a vigorous agitation of the solution flowing through the confined region and the potential difference between the reference electrode and the working electrode is held constant. The amount of Coulombs flowing between the auxiliary electrode and the working electrode is measured. The solution is fed through the confined region at such a rate that substantially all reducible and oxidizable material in the solution is reacted at (i.e. precipitated on, or reduced and oxidized at) the working electrode before the solution leaves the confined region so that the measured amount of Coulombs comprises an accurate measure of the amount or concentration of reducible and oxidizable material in the solution analyzed.

This invention relates to a method of performing coulometric analyses, and an apparatus therefor.

It is already known to perform coulometric analyses by contacting a solution to be analysed with a working electrode, a reference electrode and an auxiliary electrode while the solution is held in a container. This prior-art coulometric analysis is carried out batchwise, all reducible and oxidizable material, respectively, in the solution held in the container being reacted at (i.e. precipitated on, reduced or oxidized at) the working electrode, and the potential between the working electrode and the reference electrode, that is the potential between the working electrode and the solution, being kept constant by variation of the potential between the working electrode and the auxiliary electrode.

Characteristic of this type of coulometric analysis, usually designated electrolysis at controlled electrode potential, is that variation of the potential between the auxiliary electrode and the working electrode directly results in a variation of the potential between the reference electrode and the working electrode without any intermediary chemical steps. Another characteristic property is that the current flowing through the solution at a given potential between the reference electrode and the working electrode, is proportional to the concentration of substance that is oxidizable and reducible, respectively, at the preset potential difference. When the amount of substance in a cell decreases the current $i$ decreases approximately according to the equation $$i = i_0 e^{-pt} \qquad (I)$$

where $i_0$ is the current at the start of the electrolysis, $e$ is 2.7183 . . . , $t$ is the time in seconds, and $p$ is a constant which—as has been established—depends upon the efficiency of the agitation, the size of the diffusion constant and the volume of the cell. A small cell volume and an efficient agitation gives a high value of the constant $p$. When all substance has reacted the current falls to zero. Thus no special device is necessary to show when the analysis is completed. These characteristic properties delimit the present method, that is the coulometric analysis performed as an electrolysis at controlled electrode potential, from the form of coulometric analysis which is usually called coulometric titration and is characterized in that the point of equivalence is indicated in the same way as in titration by means of liquid reagents, i.e. potentiometrically, with the aid of indicators etc. When a current flows through the solution in the coulometric titration reagents are generated at the working electrode. The substance from which the reagent is generated shall be present in great excess all the time; for example water at the generation of acid or base, for example bromide ions at the generation of bromine. For a simple calculation of the amount of electricity supplied such a coulometric titration is often carried out with constant current. The agitation serves the purpose of intimately mixing the reagent with the solution but does not affect the speed of the electrolysis for this is entirely determined by the chosen current intensity. At the coulometric titration one pair of electrodes is required to generate the reagent. Should the indication of the point of equivalence be made with the aid of electrodes such as in the potentiometric indication, a second pair of electrodes is required for this indicating system. In special cases one electrode may be common to both systems so that three electrodes are immersed in the solution. An increase of the current or a change in the voltage of the generating system does not directly actuate the indicating system. For actuation takes place via a change in the concentrations of such chemical substances for which the indicating system is sensitive.

Use is made of electrolysis with controlled electrode potential for the precipitation of metals, the purification of solution from metals, the oxidation and reduction of metals and organic compounds etc. The uses of this method thus essentially differ from those of the coulometric titration.

It has been tried both at the electrolysis with controlled electrode potential and coulometric titration to perform the analysis continuously, exploiting the liquid flow rate as a means of maintaining the constant potential between the reference electrode and the working electrode and between the reference electrode and the potentiometer electrode, respectively. In this method of performing the analysis the result thereof thus is a function of the rate of liquid flow through the analysis vessel or the analysis cell. However, this method results in uncertain analyses with a high standard deviation which but in the most favorable cases is as low as some percent. The method of performing the coulometric analysis by electrolysis with controlled electrode potential according to the present invention on the other hand is based on the principle of maintaining the constant potential difference between the reference electrode and the working electrode by varying the potential between the working electrode and the auxiliary electrode in such a way that the potential difference between the reference electrode and the working electrode always remains constant. By doing so it is possible essentially to increase the accuracy of the analysis. This mere step is not, however, sufficient to obtain a satisfactory accuracy of the analysis.

When the electrolysis is carried out with controlled electrode potential the analyzing rate depends upon the size of the constant $p$ in the above Equation I. The previously known methods (inclusive of the method based upon a variation of the rate of liquid flow) of performing such an electrolysis are disadvantageous in that they are slow and do not therefore permit a continuous realization with reproducible accurate results merely by causing the solution to flow through the container having the three electrodes therein. To increase the analysing rate it has been tried to increase the agitation in the container by the use of ultrasonic waves and other agitating processes. It is true that this has increased the analysing rate but the coulometric analysis nevertheless could not be made continuous while retaining a high degree of accuracy as to the analysing results, which is due to the fact that it has not been possible to give the constant $p$ in the above equation a sufficiently high value.

The present invention has for its object to provide a method and a cell for coulometric analysis with controlled electrode potential, in which the analysis is carried out so rapidly that the analysis can take place continuously and with good reproducibility because it has been possible to obtain a high value for the constant $p$ in the above Equation I.

This invention therefore relates to a method of carrying out a coulometric analysis with controlled electrode potential, wherein a solution to be analysed is continuously fed through a chamber in which it is contacted with a working electrode, a reference electrode and an auxiliary electrode, while the potential between the reference electrode and working electrode is held constant by variation of the potential between the working electrode and the auxiliary electrode and while the amount of current transmitted between the auxiliary electrode and the working electrode is measured. The method according to the present invention is characterized by the steps of vigourously agitating the solution during its flow through the chamber with the aid of the working electrode, the solution being fed through the chamber at such a rate that substantially all reducible and oxidizable material, respectively, in the solution is reacted at (i.e. precipitated on, or reduced and oxidized at) the working electrode before the solution leaves the chamber. It is particularly suitable to cause the working electrode to quickly rotate in the chamber in order vigourously to agitate the solution. The working electrode can also be caused to vibrate so that the vigourous agitation of the solution is realized. It is also possible to combine the rotation and vibration of the working electrode. Very good results have been reached when the chamber is formed as a substantially cylindrical space of small height and the axis of rotation of the working electrode is oriented substantially vertically, whereupon the solution is continuously supplied from below into the chamber at or adjacent the axis of rotation of the working electrode and is fed outwardly towards the periphery of the chamber by the working electrode and is then allowed continuously to escape through one or more outlets at the top of the chamber at or adjacent to the axis of rotation of the working electrode. It should be mentioned that it has been possible by applying the method according to the invention to obtain a value of $0.2$–$0.8$ sec.$^{-1}$ for the constant $p$ in the above mentioned Equation I, which is in sharp contrast to the values obtained by the previously known methods, which at best are $0.02$ sec.$^{-1}$ and as a rule still lower.

The present invention also relates to a cell for performing a coulometric analysis in the manner described above, and this cell has a container for the solution to be analysed and a working electrode, a reference electrode, and an auxiliary electrode, said container having the form of a chamber with inlet and outlet for permitting continuous feed of solution through the chamber, and the reference electrode and the auxiliary electrode being connected to the chamber. The cell according to the invention is characterized by the fact that the working electrode is movable in the chamber for enabling vigourous agitation of the solution in the chamber. It is suitable in such a cell that the connection of the auxiliary electrode to the chamber forms one of the chamber walls, the connection being constituted for instance by a semipermeable wall capable of preventing the penetratiton of the solution from flowing therethrough and allowing an electric current to pass at low resistance. The semipermeable wall may be for instance a sintered glass disk, a dialysis diaphragm and/or ion exchange diaphragm.

The auxiliary electrode may, however, also be in direct contact with the solution to be analysed. In that case the auxiliary electrode should consist of a material not disturbing the reaction at the working electrode, or a material that upon reaction with substances in the solution does not disturb the reaction at the working electrode. Which material to choose depends upon the composition of the solution to be analysed.

The working electrode or at least the surface thereof contacting the solution preferably consists of platinum but other materials may also be used, such as gold, copper, graphite, mercury-coated platinum etc. The working electrode should preferably be disk-shaped and comprise one or more possibly perforated disks of rough surface, or one or more wire meshes, the working electrode being rotatable in the chamber about an axis approximately perpendicular to the plane of the electrode. However, the working electrode preferably is a wire mesh. Particularly favourable results of the analysis are reached if the chamber is in the shape of an approximately cylindrical space of small height, the axis of rotation of the working electrode being coaxial with the substantially clindrical chamber and vertical, and, if the inlet of the chamber is disposed centrally at the bottom of the chamber, at or adjacent the axis of the substantially cylindrical chamber, and, if the outlet of the chamber is disposed at the top of the chamber, at or adjacent the axis of the substantially cylindrical chamber.

The above and further features of the invention and the advantages gained thereby will become apparent from the following detailed description in which reference is made to the accompanying drawings.

Figure 1:
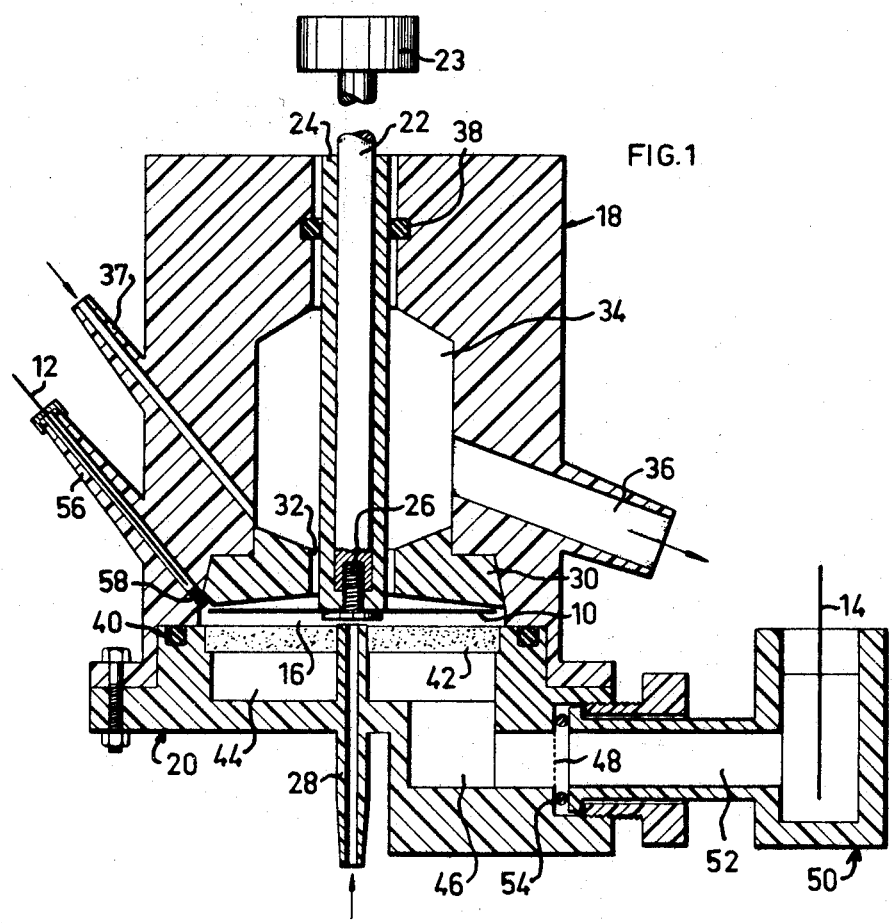
FIG. 1 shows a cell according to the invention.

The cell shown in FIG. 1 has a working electrode 10, a reference electrode 12 and an auxiliary electrode 14. The working electrode 10 is mounted for rotation in a chamber 16 contained in a housing 18 and delimited at the bottom by a bottom closure 20. The working electrode 10 is secured to an axis 22 which extends through the housing 18 and is connected with a motor 23 and on the outer side provided with a sheath 24 of electrically insulating material. The working electrode 10 is held clamped against the sheath 24 with the aid of a screw 26 of insulating material and is electrically connected to the axis 22 by means of a conductor (not shown) of for instance platinum. An inlet pipe 28 which extends through the bottom closure 20 opens centrally in the chamber 16 at the centre of the working electrode 10. The chamber 16 is delimited at the top by an insert 30 of electrically insulating material and having a central hole of larger diameter than the outer diameter of the sheath 24 so that an annular gap 32 is formed between the sheath 24 and the insert 30. In the housing 18 above the insert 30 there is a chamber 34 from which the outlet 36 of the cell starts. An inlet 37 opens into the chamber 34 and, if need be, an inert gas e.g. nitrogen, can be introduced through said inlet. At the top the chamber 34 is sealed from the atmosphere by means of a sealing ring 38 which is disposed in a groove in the bore of the housing 18, which is intended for the shaft 22 and its sheath 24.

Figure 4:
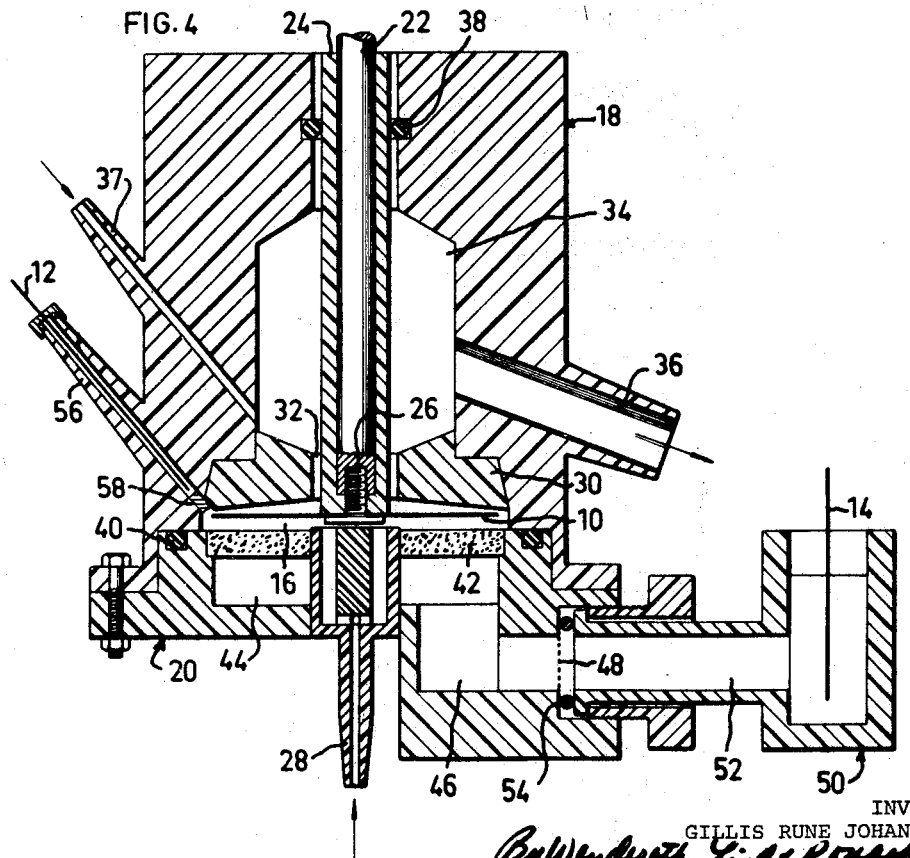
FIG. 4 shows a modified inlet for the solution to be analysed.

The inlet for the solution to be analysed can also open into the chamber 16 at or adjacent the axis of the chamber. In FIG. 4 the inlet pipe 28 is thus connected to an annular space 29 which in turn opens into the chamber 16 adjacent the axis thereof.

The chamber 16 is defined at the bottom by the bottom closure 20 which is connected to the housing 18 by means of bolts and nuts. The seal between the bottom closure 20 and the housing 18 is realized by means of a sealing ring 40 disposed in an annular groove at the top of the bottom closure 20. The sealing ring 40 is sealingly pressed against a shoulder in the housing 18. The bottom closure 20 at the top has a sintered glass disk 42 one side of which forms one wall of the chamber 16 and the other side of which forms a wall in a circular space 44 in the bottom closure 20. Said space 44 is connected with a passage 46 the mouth of which is closed by means of a dialysis diaphragm 48. Outside the dialysis diaphragm 48 is a threaded bore into which a lateral container 50 is screwed. The lateral container 50 has a passage 52 which opens at the dialysis diaphragm 48. The seal between the lateral container 50 and the bottom closure 20 is realized by a sealing ring 54 which is clamped between the lateral container 50 and the bottom closure 20. The auxiliary electrode 14 projects into the lateral container 50.

The housing 18 also has a socket 56 which opens at the periphery of the chamber 16, and the reference electrode 12 is passed into said socket.

In the embodiment of the cell according to the invention illustrated in FIG. 1 the working electrode is a platinum wire mesh made up by wires having a diameter of e.g. 0.1 mm., and a mesh width of e.g. 0.5 mm. However, the working electrode may also be a disk of platinum or coated with platinum and having a rough surface and being possibly perforated. The irregular surface may in that case be formed by small projections, studs, knurls, nipples and like elements.

The reference electrode 12 may be formed in several ways. In FIG. 1 it is in the form of a silver wire coated with silver chloride and pushed into the socket 56 down to a plug 57 consisting of asbestos and silica gel. The space above the plug 58 is filled with a saturated potassium chloride solution. The reference electrode may, however, also be a customary calomel electrode or consist of mercury sulfate. The plug 58 can be dispensed with if the reference electrode is capable of withstanding the liquid pressure in the chamber 16.

The space 44 and the passage 46 in the bottom closure 20 are filled with a suitable electrolyte and for instance silica gel or agar-ager gel. The passage 52 and the lateral container 50 are filled with a suitable electrolyte into which dips the auxiliary electrode 14. A suitable electrolyte is for example a saturated sodium sulfate solution. The solution analyzed in the space 16 is thus prevented from reaching the auxiliary electrode by the sintered glass disk 42, the silica gel in the space 44 and the passage 46, and the dialysis disphragm 48. However, electric current can flow from the chamber 16 to the auxiliary electrode 14, the voltage drop between the chamber 16 and the auxiliary electrode being insignificant.

Figure 3:
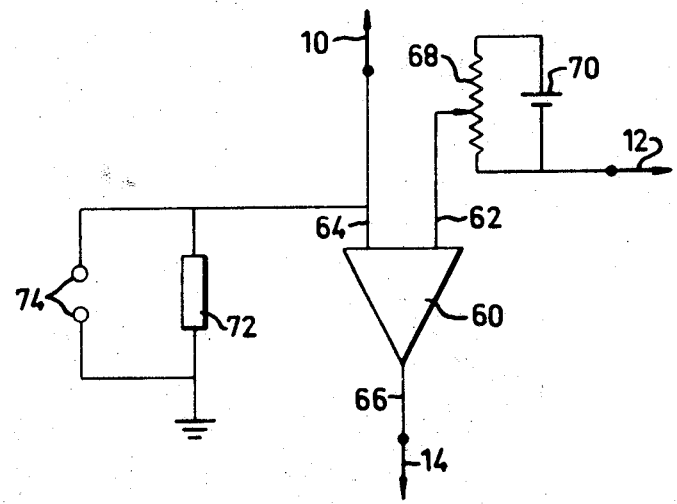
FIG. 3 shows a wiring diagram for the cell according to the invention.

A conventional wiring diagram for coulometric analysis is shown in FIG. 3, and it can also be used for the cell according to the present invention. The wiring diagram comprises a differential amplifier 60 supplied via a current source (not shown) one pole of which is connected to the differential amplifier and the other pole of which is connected to earth. One input 62 of the differential amplifier is connected with the movable contact of a potentiometer 68 across which is connected a D.C. source 70. The reference electrode 12 is connected to one fixed contact of the potentiometer 68. The other input 64 of the differential amplifier is connected via the motor shaft 22 to the working electrode 10 and is connected to earth over a resistor 72. The amount of current flowing between the working electrode 10 and the auxiliary electrode 14 is measured for instance by means of an integrator (not shown), between the terminals 74, i.e., across the resistor 72. The potentiometer 68 permits adjusting the desired potential between the working electrode 10 and the reference electrode 12, i.e., between the working electrode and the solution being analysed. This adjusted potential is held constant by the differential amplifier 60 during the course of the analysis.

When the cell according to FIG. 1 is utilized for analysing a solution containing for instance silver nitrate or copper sulfate the solution is caused to flow through the inlet pipe 28 centrally into the chamber 16 at the centre of rotation of the working electrode 10. The working electrode 10 rotates rapidly, e.g., at 2600 r.p.m., and the solution is thus vigourously agitated by the working electrode during its movement towards the periphery of the chamber 16. The solution flows on one hand through the meshes of the platinum wire mesh 10 and on the other hand about the periphery of the platinum wire mesh 10, and then flows back towards the centre of the chamber above the working electrode to finally flow in an upward direction through the annular gap 32 to the space 34 in the housing 18. Finally the solution escapes through the outlet 36. The rotation of the working electrode 10 generates a vortex in the chamber 16 and an empty space is thus formed at the centre of the chamber 16. During the analysis nitrogen or some other inert gas can be continuously introduced through the socket 37 to provide an inert atmosphere in the cell. The intention is that approximately all reducible and oxidizable material, respectively, in the solution be reacted at the platinum electrode 10 while the solution is in the chamber 16. The solution shall thus be supplied to the chamber 16 at such a rate that all reducible and oxidizable material, respectively, in the solution has been reacted at the working electrode 10 before the solution leaves the chamber through the gap 32. However, this rate is preset at a sufficiently high value to achieve reaction of all reducible and oxidizale material, respectively, and it is therefore unnecessary to change the rate during the course of analysis. As a result of bringing all reducible and oxidizable material, respectively, to react it is possible to perform a continuous analysis with good reproducibility and great accuracy.

However, for a good result of the analysis it is essential that the solution be vigourously agitated while in the chamber 16. It has been established by way of experiments that the best result is obtained with a platinum wire mesh as the working electrode 10.

Figure 2:
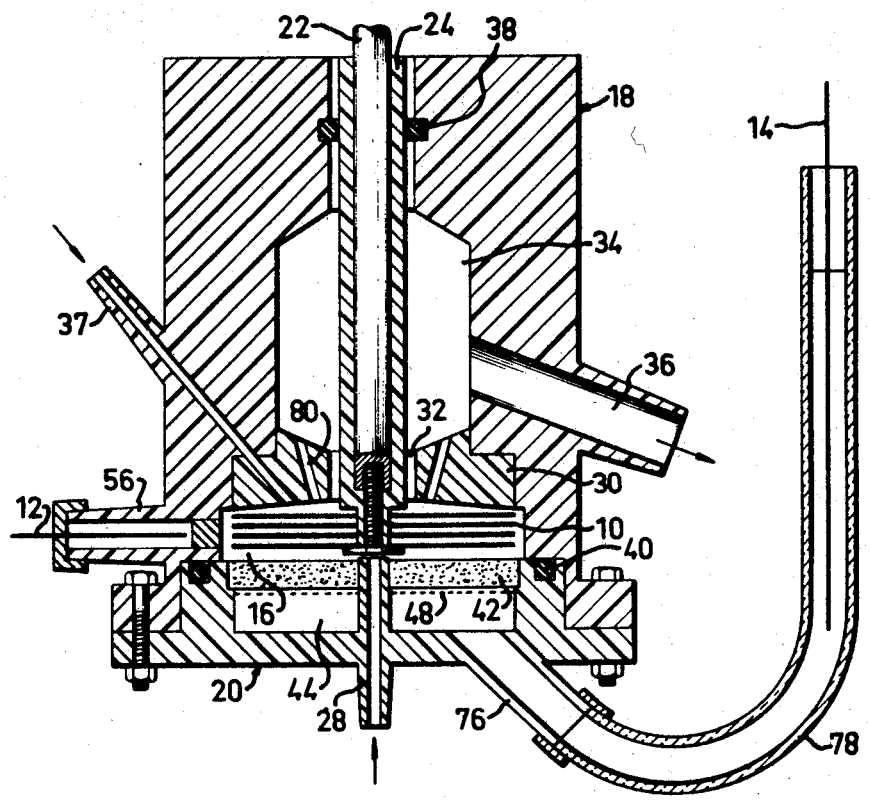
FIG. 2 shows another cell according to the invention.

Another embodiment of the cell according to the invention is shown in FIG. 2. This cell differs from that in FIG. 1 in some respects. Thus the working electrode 10 comprises several platinum wire meshes which are disposed parallel to and at an insignificant distance from each other, said platinum wire meshes being secured to the sheath 24 of the motor shaft 22 and electrically connected to the motor shaft 22. Like in the cell of FIG. 1 the bottom of the chamber 16 is formed by a sintered glass disk 42. A dialysis diaphragm 48 arranged immediately beneath the sintered glass disk 42. The space 44 beneath the dialysis diaphragm 48, the socket 76 and the hose 78 are filled with for instance a saturated sodium sulfate solution or a mixture of e.g., silica gel and saturated sodium sulafte solution. The auxiliary electrode 14 dips into the solution contained in the hose 78. The cell in FIG. 2 thus has no lateral container 50, but such container is formed by the socket 76 and the hose 78.

In the cell of FIG. 2 the socket 56 for the reference electrode 12 opens radially into the substantially cylindrical chamber 16, and the inlet 37 for an inert gas, e.g. nitrogen, opens into the upper wall of the chamber formed by the insert 30. Like in the cell of FIG. 1 an annular gap is provided between the insert 30 and the sheath 24 in the cell of FIG. 2. However, the insert 30 in the cell of FIG. 2 also has some bores 80 extending obliquely outwardly from the chamber 16 and opening into the space 34 of the housing 18. These bores 80 also serve to lead the solution from the chamber 16 to the space 14.

When the cell is used for analysing a solution containing a metal which is precipitated on the working electrode it is found that the precipitation mainly takes place adjacent the inlet of the chamber 16. In use the cell is cleaned from time to time with for instance nitric acid.

In performing a coulometric analysis it may sometimes be advantageous to work at elevated pressure, which is also possible with the cell according to the invention. The only modification that one will have to resort to in the two cells illustrated in the drawings is that the lateral container 50 and the hose 78, respectively, at the upper end around the auxiliary electrode 14 has to be sealed to atmosphere. The space 34 and the chamber 16 are sealed to atmosphere by means of the sealing rings 38 and 40, respectively.

An experiment was made with the cell shown in FIG. 1 and wired in accordance with FIG. 3. A solution containing sodium sulfate and silver nitrate was analysed, and the potential between the working electrode 10 and the reference electrode 12 was held constant. Experiments were conducted at various potentials between the working electrode and the reference electrode and solutions of known composition were analysed. On the basis of the amounts of current measured across the resistor 72 the analysed amount of silver nitrate in the solution was calculated. The following table contains the results from ten experiments. As will appear from the table the continuous analysis could be performed with great accuracy.

| Potential between electrodes 10 and 12 mv. | AgNO₃ in the solution | | |
|---|---|---|---|
| | Known micromol | Found micromol | Yield, percent |
| −100 | 88.9 | 88.97 | 100.1 |
| −100 | 118.6 | 118.37 | 99.8 |
| −200 | 88.9 | 89.30 | 100.4 |
| −200 | 88.9 | 89.17 | 100.3 |
| −200 | 88.9 | 88.99 | 100.1 |
| −200 | 118.6 | 118.45 | 99.9 |
| −200 | 118.6 | 118.68 | 100.1 |
| −200 | 148.2 | 147.99 | 99.9 |
| −250 | 148.2 | 148.21 | 100.0 |
| −250 | 148.2 | 148.76 | 100.4 |
| Mean value | | | 100.1 |
| Standard deviation | | | 0.2 |

The method and the cell according to the invention thus permit continuously analysing flowing solutions from e.g. chromatography columns, which has not been possible to perform according to the hitherto known methods and cells for coulometric analysis while obtaining exact results. The invention thus makes it possible—in regard of composition—continuously and accurately to watch various flows containing reducible or precipitable and oxidizable material, respectively.

What I claim and desire to secure by Letters Patent is:

1. A method of performing controlled-potential coulometry comprising the steps of feeding a solution to be analyzed continuously from below into a confined region, bringing the solution in the region in contact with a working electrode, a reference electrode, and an auxiliary electrode, varying the potential difference between the working electrode and the auxiliary electrode for holding the potential difference between the reference electrode and the working electrode constant, measuring the amount of coulombs flowing between the auxiliary electrode and the working electrode, rapidly rotating the working electrode in the confined region for vigorously agitating the solution therein, orienting the axis of rotation of the working electrode substantially vertically in the confined region, the solution being fed from below into the confined region adjacent the axis of rotation of the working electrode, bringing the solution to flow outwardly towards the circumference of the confined region and thereafter inwardly towards the center of the confined region, withdrawing the solution continuously from the top of the confined region adjacent the axis of rotation of the working electrode, and adjusting the flow of the solution through the confined region so as to permit substantially all reducible material in the solution to react at the working electrode before the solution leaves the confined region.

2. A method of performing controlled-potential coulometry, comprising the steps of feeding a solution to be analyzed continuously through a confined region, bringing said solution in said region in contact with a working electrode, a reference electrode, and an auxiliary electrode, varying the potential difference between the working electrode and the auxiliary electrode for holding the potential difference between the reference electrode and the working electrode constant, measuring the amount of coulombs flowing between the auxiliary electrode and the working electrode, rapidly rotating said working electrode in said confined region for vigorously agitating the solution flowing through the confined region, adjusting the flow of the solution through the confined region so as to permit substantially all reducible material in the solution to react at the working electrode before the solution leaves the confined region, and further comprising the steps of orienting the axis of rotation of said working electrode substantially vertically in the confined region, feeding the solution continuously from below into the confined region at the axis of rotation of the working electrode, bringing the solution to flow outwardly towards the circumference of the confined region and thereafter inwardly towards the center of the confined region, and withdrawing the solution from the top of the confined region at the axis of rotation of the working electrode.

3. An apparatus for use in controlled-potential coulometry, having a vessel for a solution to be analyzed; at least one disk-shaped means constituting a working electrode; a reference electrode; an auxiliary electrode; means defining a substantially cylindrical chamber of small height in relation to its diameter; motor means for rapidly rotating said disk-shaped means about an axis of rotation substantially perpendicular to said disk-shaped means; means for holding said disk-shaped means with its axis of rotation vertical and coaxial with the substantially cylindrical chamber; means defining an inlet to the substantially cylindrical chamber and being arranged adjacent the axis of rotation of said disk-shaped means and at the bottom of the substantially cylindrical chamber; means defining an outlet from the substantially cylindrical chamber and being arranged adjacent the axis of rotation of said disk-shaped means and at the top of the substantially cylindrical chamber; said inlet and outlet defining means being arranged to permit a continuous flow of solution through the substantially cylindrical chamber; means connecting said reference electrode to the substantially cylindrical chamber at a point adjacent the edge of said disk-shaped means; and means connecting said auxiliary electrode to the substantially cylindrical chamber.

4. The apparatus of claim 3, wherein said means connecting said auxiliary electrode to the substantially cylindrical chamber are semi-permeable and are capable of preventing penetration of the solution and of permitting electrical current to pass at low resistance.

References Cited

UNITED STATES PATENTS

| | | | |
|---|---|---|---|
| 2,954,336 | 9/1960 | Grutsch | 204—195 |
| 3,131,133 | 4/1964 | Barendrecht | 204—195 |
| 3,154,477 | 10/1964 | Kesler | 204—1.1 |
| 3,162,585 | 12/1964 | De Ford et al. | 204—1.1 |
| 3,244,608 | 4/1966 | Strickler | 204—195 |
| 3,341,430 | 9/1967 | Wickerham et al. | 204—195 |
| 3,398,064 | 8/1968 | Propst | 204—195 |
| 3,448,031 | 6/1969 | Robinson | 204—195 |

T. TUNG, Primary Examiner

U.S. Cl. X.R.

204—195